Oct. 29, 1946. H. SCHNEIDER ET AL 2,410,185
ROTARY HYDRAULIC TORQUE CONVERTER
Filed Dec. 4, 1942 5 Sheets-Sheet 1
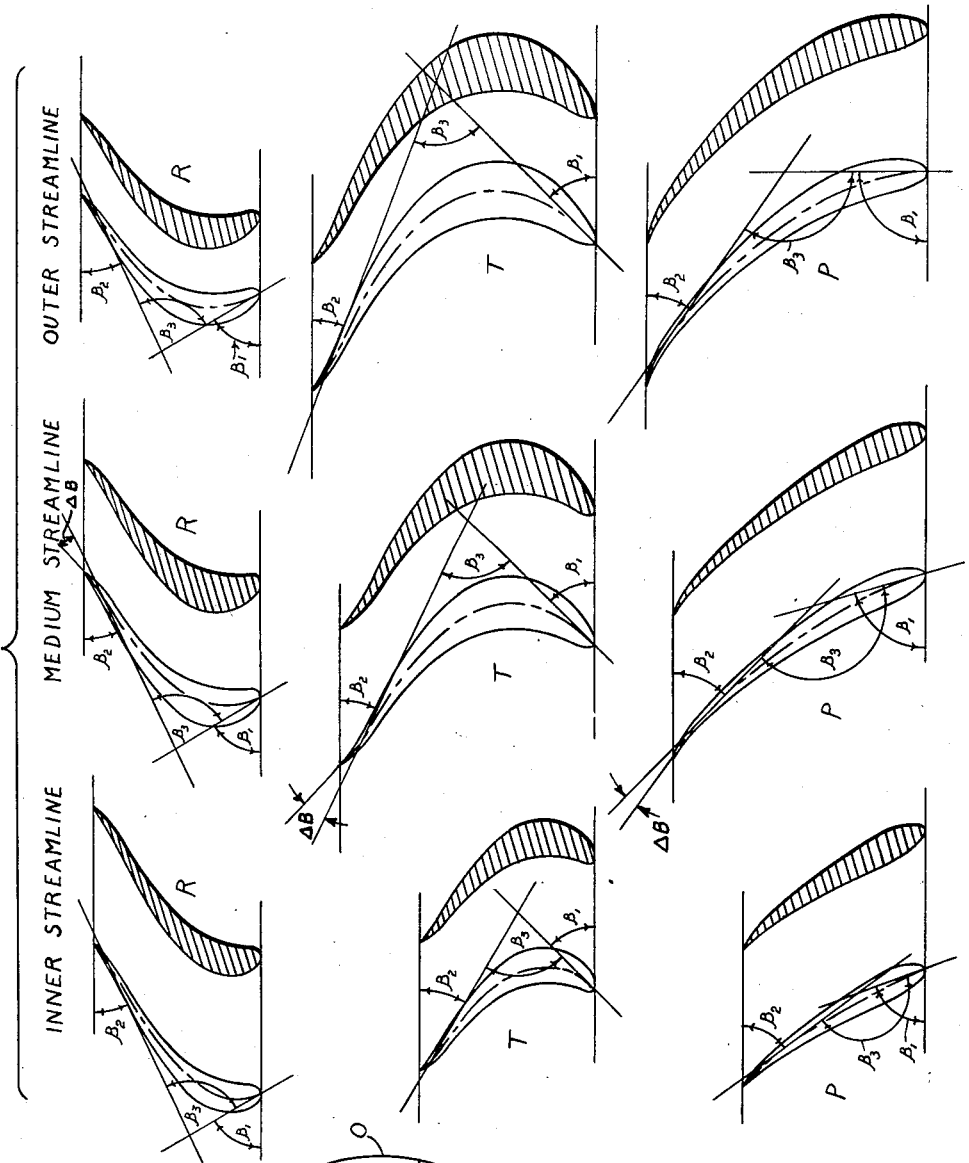
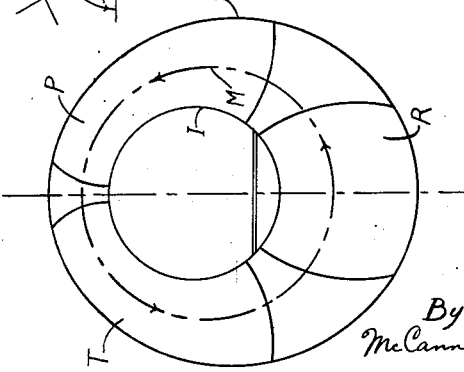
Inventors
HEINRICH SCHNEIDER,
AND ADOLF G. SCHNEIDER.
By McCanna, Wintercorn & Morsbach
Attys.

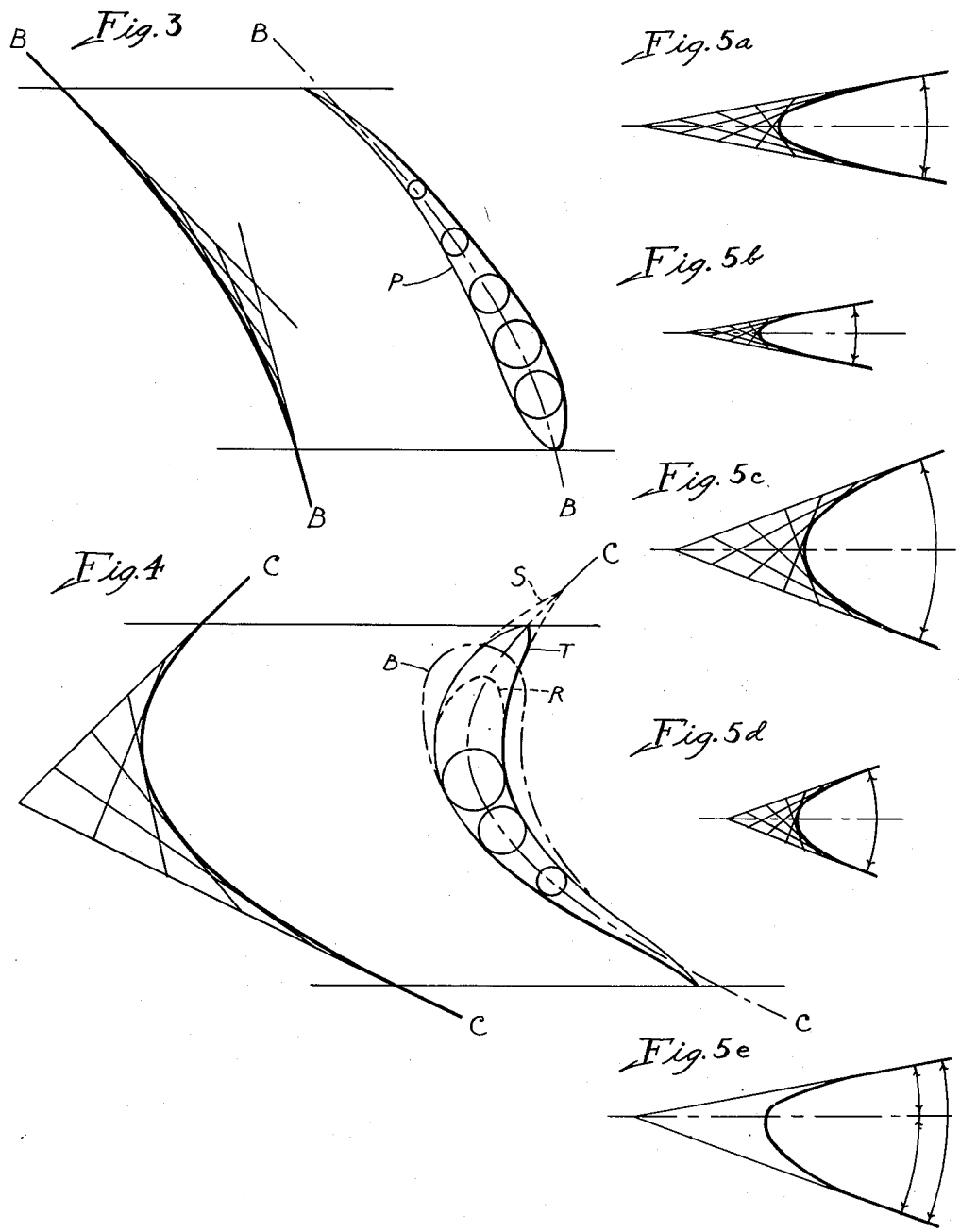

Inventors
HEINRICH SCHNEIDER,
AND ADOLF G. SCHNEIDER.
By McCanna, Wintercorn & Morsbach
attys.

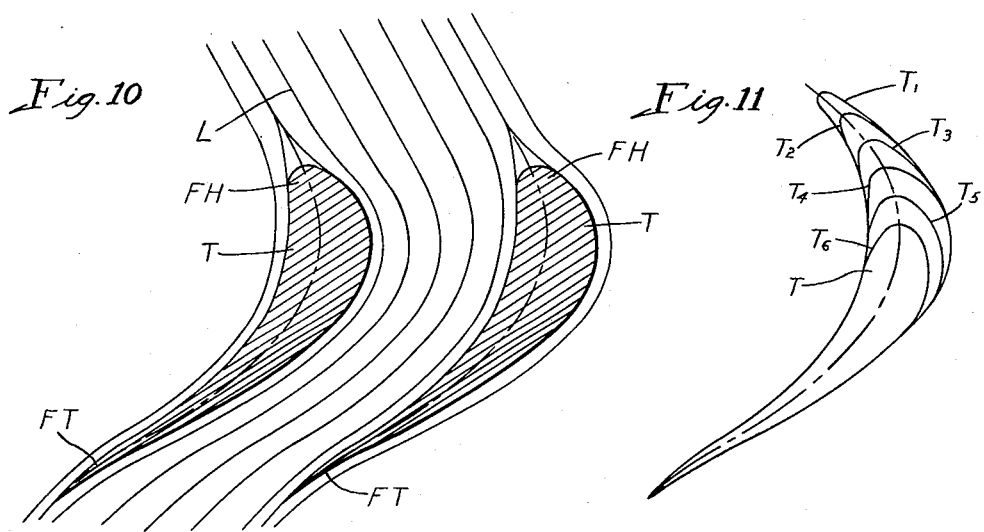
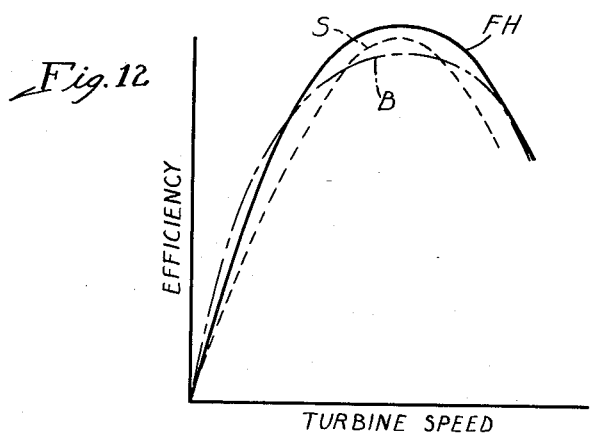
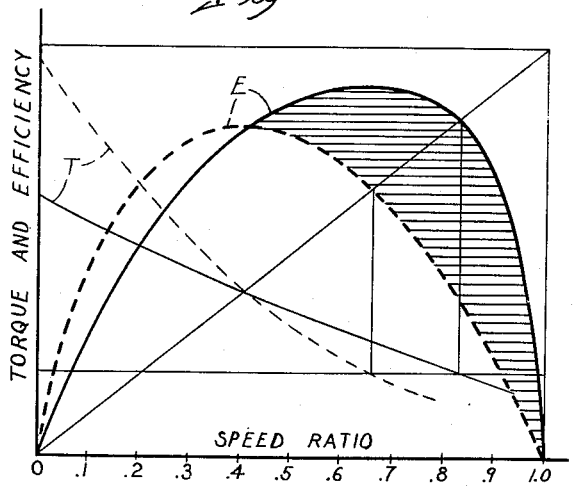

Patented Oct. 29, 1946

2,410,185

UNITED STATES PATENT OFFICE 2,410,185

ROTARY HYDRAULIC TORQUE CONVERTER

Heinrich Schneider, Hamilton, Ohio, and Adolf G. Schneider, Muncie, Ind., assignors to Schneider Brothers Company, a copartnership composed of Heinrich Schneider and Viva Schneider, Hamilton, Ohio, and Adolf G. Schneider and Erna Schneider, Muncie, Ind.

Application December 4, 1942, Serial No. 467,864

13 Claims. (Cl. 60—54)

This application is related to the copending application of Heinrich Schneider and Ernst W. Spannhake, Serial No. 327,270, filed April 1, 1940, which resulted in Patent 2,306,758, issued December 29, 1942.

This invention relates to torque converters of the turbine type, comprising at least a pump, a turbine, and a reaction member.

The principal object of our invention is to increase the range of highly efficient operation and obtain generally higher efficiency in a torque converter and, more particularly, a torque converter in the size-range suitable for automotive use, by reduction of friction, shock, fluctuation, and turbulence losses. We attain this, in accordance with the present invention:

(1) By giving the blade section of the wheels a novel streamlined shape;

(2) By changing this streamline shape and blade profile gradually and continuously from the inner to the outer contour of the channels of the turbine ring circuit, and (3) By relating the entrance and exit angles of each individual portion of the blading of each wheel to the respective portion of the neighboring wheel in such a way that shock and turbulence losses are a minimum over a wide operating range.

Another object of the invention consists in correlating the blade sections in such a way that at one certain speed ratio of turbine to pump, the shock losses of each wheel as well as the sum of the shock losses of all of the wheels is a minimum.

A salient feature of the torque converter of our invention consists in the provision of blades with fish-head shaped entrance portions and fish-tail shaped exit portions, the portions therebetween being curved continuously and gradually so that there are neither substantially flat nor cylindrical portions at any point, but instead continuous and gradually changing parabolic portions, the fish-head shaped entrance portions being adapted to penetrate the fluid stream with least head resistance, and the fish-tail shaped exit portions eliminating turbulence in the fluid therebehind, and the gradually and continuously curved parabolic intermediate portions of the blades making for minimum resistance to fluid flow. Each blade's longitudinal cross-section, in accordance with our invention has a parabolic center-line laid out according to the known geometric construction of a parabola, between the tangents of its end portions.

Another salient feature of our invention in contrast to other converter designs, particularly the adjustable blade type and the multiple stage type, which aim at extremely high torque increase at the lower turbine speeds, is its simplicity and compactness, the converter having only three bladed wheels with fixed blades, the number of blades being reduced to a minimum to cut down wall friction and accordingly increase discharge, the blade form, being fixed, being selected to obtain best results over the useful operating range.

The invention is illustrated in the accompanying drawings, wherein—

Fig. 1 is a diagrammatic illustration of a torque converter embodying our invention, showing the turbine ring circuit;

Fig. 2 is a diagrammatic illustration of the three sets of blades showing the form thereof along the inner and outer contours, as well as along the middle streamline;

Figs. 3 and 4 are diagrams illustrating the lay-out of the blade sections, Fig. 3 having reference to the pump, and Fig. 4 having reference to the turbine and reaction member;

Figure 6:
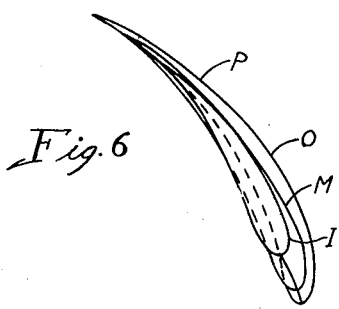
Figure 9A:
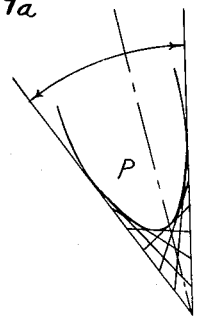
Figure 7:
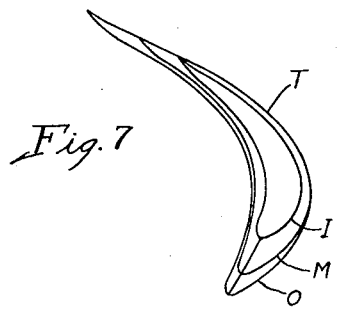
Figure 9B:
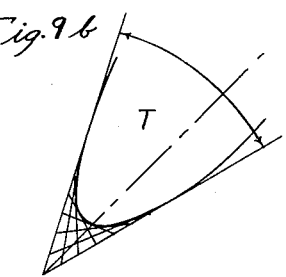
Figure 8:
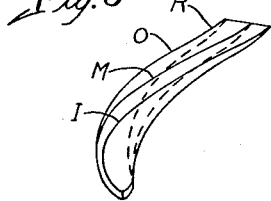
Figure 9C:
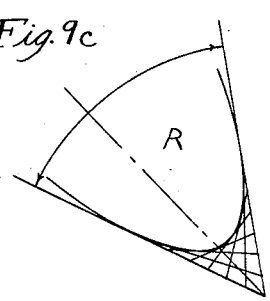
Figure 14:
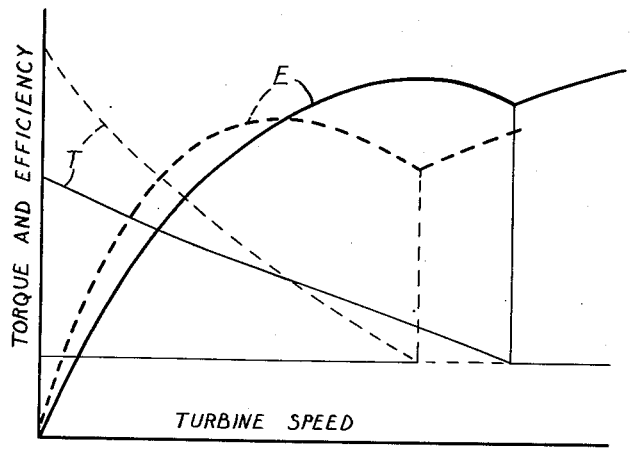
Figure 15:
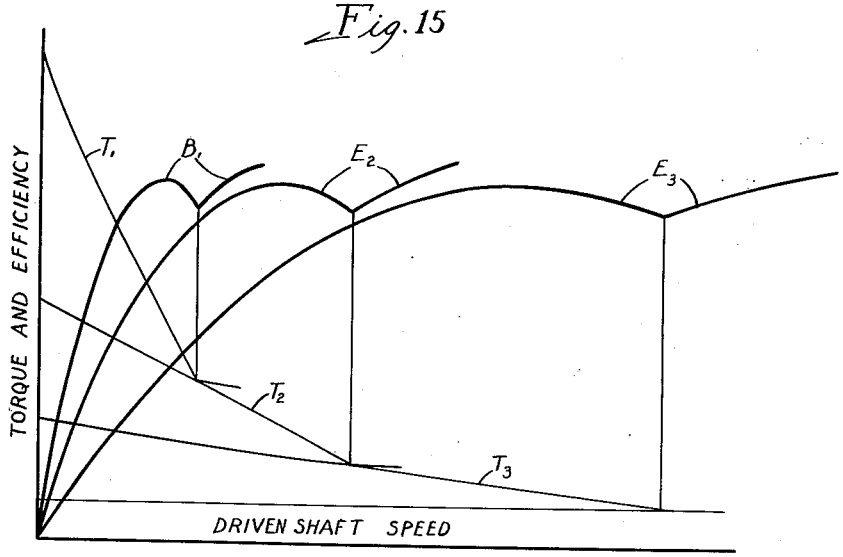

Figs. 5a to 5e, inclusive, are typical diagrams illustrating the lay-out of the blade heads, Figs. 5a to 5d showing symmetrical heads, and Fig. 5e showing an asymmetrical head;

Figs. 6, 7, and 8 are compound views of the pump, turbine, and reaction member blades, respectively, showing diagrammatically the outline of the blade section in relation to each other along the inner contour I and outer contour O and along the middle streamline M;

Figs. 9a to 9c are diagrams showing the construction of parabolic heads for the blades in enlarged scale;

Fig. 10 illustrates two blades of the turbine or reaction member, showing diagrammatically the fluid streamlines;

Fig. 11 shows a blade similar to those appearing in Fig. 10, but illustrating diagrammatically a series of different fish or parabolic shaped head or entrance portions;

Fig. 12 is a set of efficiency curves, showing the greater efficiency of performance obtained with fish-shaped entrance portions as compared with sharp or bluntly rounded entrance portions;

Fig. 13 is a set of torque and efficiency curves, showing in full lines the performance of our improved torque converter and in dotted lines the performance of a multiple stage type converter;

Fig. 14 is a set of efficiency and torque curves of the same converters as in Fig. 13, but showing the performance with freewheeling of the reaction member, and Fig. 15 is a set of efficiency and torque curves of our improved converter showing the efficiency and torque curves in combination with three reduction gear ratios.

Similar reference numerals are applied to corresponding parts throughout the views.

There are various factors accounting for loss in efficiency in the operation of torque converters. One of these is the friction loss, like those occurring wherever a fluid flows in a closed channel, and the amount of loss depends upon the speed with which the fluid is circulated and upon the amount of surface traversed, and these losses are larger if the fluid velocity decreases at any given point. Another loss, commonly called shock loss, is that occurring at the entrance to a bladed wheel, due to the fluid discharged from one wheel encountering the blades of the next wheel at an awkward angle, thus producing a churning action with consequent loss of power. Another loss, called the fluctuation loss, arises from still another interaction of two neighboring wheels, and that loss arises from the discharge from the center of the blade channel being at a different angle from the discharge along the blade walls, for example. In the torque converter of our invention, all of these losses have been greatly reduced and the all around efficiency has accordingly been greatly increased, special consideration having been given to obtaining in the smaller sized torque converters suitable for automotive use, that is to say in the torque converters from about twenty horsepower to about two hundred horsepower, the high efficiency previously obtainable only in the much larger sizes. Best efficiency and torque increase could be obtained in a torque converter if the entrance and discharge angles of the blades of the pump, turbine, and reaction member could be so adjusted as to eliminate shocks and obtain smooth flow at each and every speed ratio. However, adjustment of the entrance and exit angles, while still providing smooth blade portions connecting the entrance and exit portions, leads to such complications in design and construction that it is apparent that a practical solution to the problem does not lie in that direction. In contrast to other torque converters, particularly the adjustable blade type and the multiple stage type, which aim at extremely high torque increase at the lower turbine speeds, our preferred type torque converter, namely, a type adapted for automotive use, is of simple and compact design with only three bladed wheels with fixed blades, namely, the pump P, turbine T, and reaction member R, illustrated in Fig. 1, this converter being especially constructed with a view to maximum efficiency over a reasonably large range of turbine speeds, there being a satisfactory torque increase at the lower turbine speeds and torque increase being maintained up to relatively high turbine speeds, as will be apparent from an inspection of Figs. 13 and 14. To obtain transmissions which require greater torque increases, we combine our converter with the highly efficient multiple gear sets, so as to make use of the high efficiency range of our converter over various gear set speed and torque ranges, as indicated in Fig. 15, suitable for automotive applications. By using the well known freewheeling of the reaction member in our converter as well as the known two-way power flow, by means of planetary gears, we obtain a highly efficient speed range of great extent, and, combined with multiple gear sets, the high efficiency operating range of this combination takes care of practically any automotive transmission problem satisfactorily. As a result of the improvements of our invention, torque converters in the range most suitable for automotive use—from twenty horsepower to two hundred horsepower—have been given an increase in efficiency from five per cent (5%) to as much as eight per cent (8%) over what was heretofore considered the generally accepted efficiency for torque converters in this range.

Referring to Fig. 1, the axis of rotation is indicated at A—A, and the inner contour or streamline for the turbine ring circuit is designated I, the outer contour or streamline O, and the medium streamline M, the counterclockwise direction of flow in the circuit being indicated by arrows. We have reduced the velocity variation in each streamline to a minimum by making the area of every section of the circuit substantially alike and by making the inner and outer contours I and O of the circuit substantially circular, as clearly appears in Fig. 1. The cross-sections of the blades of these wheels, pump P, turbine T, and reaction member R are illustrated in Fig. 2, the left hand row showing the developed section along the inner streamline I, the middle row showing the section along the medium streamline M, and the right hand row showing the section along the outer streamline O. The entrance angles are marked $\beta_1$, the exit angles $\beta_2$, and the included angles $\beta_3$. The fish-tail underbent angles are marked $\Delta\beta$. To obtain maximum efficiency at higher speed ratios, the blades are so constructed that the entrance angles $\beta_1$ and exit angles $\beta_2$ are so related that the fluid enters the blades with minimum shock losses when the turbine rotates at higher speeds. A sacrifice in torque increase has to be made when it is desirable to have the high efficiency range at higher speed ratios; but when highest efficiency is desired, particularly in combination with multiple step gears, blading design for higher speed ratios is advantageous. The shock losses are a minimum at a certain speed ratio when the entrance portions of the blades are angularly disposed with relation to the associated exit portions of the blades of the other wheels in such a way that the entrance angle substantially corresponds to the resultant discharge angle of the flow at the stated speed ratio for smoothly receiving the fluid, while the friction losses increase with the square of the relative velocities.

Referring now to Figs. 3 and 4, in Fig. 3 there is shown at the left the construction of the parabolic center line B—B of the blade section according to the known geometric construction of a parabola between the tangents of its end portions, and at the right in the same figure is the corresponding pump blade section P. Fig. 4 shows the construction of the parabolic center line C—C at the left for the blade of a turbine and reaction member, the preferable entrance head for a turbine being indicated in full lines at T and for a reaction member blade in dotted lines at R. Further variations in the entrance head form used by others are indicated by the dot and dash lines indicating a bluntly rounded entrance B, and by the dotted lines showing a sharply defined entrance head S. The center line of each blade section is of parabolic form, with the form changing gradually and continuously from the inner to the outer streamline, as illustrated in Fig. 2, so that the inlet and exit angle on each streamline changes more or less, as well as the included angle, over the width of the channel. The profile of each blade comprises parabolic portions throughout. The longitudinal cross-section of the blade is shaped along each streamline, as a whole like a well streamlined fast fish, more or less curved or bent. The blade heads consist of two like or different parabolic portions on each side of the center line, continuing in additional different parabolic portions over the heaviest part of the blade profile, and thereafter in less curved flatter, parabolic portions toward the thinner exit end portion of the blade, and ending in a sharp edge. The end portion is underbent, marked $\Delta\beta$ in Fig. 2, deviating from the parabolic center line to balance the pressures and velocities of the fluid on opposite sides of the blade before the fluid leaves the blade, whereby to reduce turbulence and fluctuation losses. We have found that a change to the fish-shaped heads or entrance portions and exit tail portions has pronounced effect on efficiency. Air-foil and hydro-foil blade shapes are efficient only for a given speed ratio and for little variation in fluid direction and little curved blades, but they would have to be made adjustable to be efficient over a reasonable speed range, whereas the fish-shaped blades herein disclosed are efficient over a large speed range. With the standard blade exits, without fish-tail ending, the fluid flow diverges after leaving the blades, and the medial flow underbends in reference to the exit blade angle, and pressure and velocity equalization takes place with disturbing turbulence losses. With the fish-tail ending on the blades, as illustrated in Fig. 10, the fluid flow, as indicated by the streamlines L, is guided into its natural path so as to at least reduce, if not substantially eliminate, the turbulence and fluctuation losses, which are usually the worst losses in the whole power conversion in any blading and vanes handling air or liquids. The fish-tails are indicated at FT in Fig. 10, and it will be noted that the flow lines L convert from the entrance to the exit and diverge in passing these ends, so that equalization of pressure and velocities on opposite sides of the blades occurs without disturbing turbulence losses. The blades being shaped, as a whole, like well streamlined fast fish, such as trout and salmon, give the best results in pump, turbine, and reaction members, and highest all around performance in torque converters. We are aware that torque converters have been made in which the blades have bluntly rounded head portions, as indicated at B in Figs. 4 and 12, with a view to receiving fluid from different directions without too much loss in efficiency, but an analysis of the operation of such converters indicates that the bluntly rounded heads present sudden area restrictions and they cause a sudden velocity change, and an increase in front head shock losses, so that the maximum efficiency is seriously reduced, especially when the on-coming fluid is directed at the same angle as the entrance angle of the blades and the fluid strikes the bluntly rounded blade heads head on. On the other hand, sharp blade entrance edges, like those indicated at S in Figs. 4 and 12, are still less practical when the direction of the on-coming fluid changes as much as it does in variable speed torque converters. Sharp entrances increase the turbulence and shock losses above and below the design point so much that the efficiency at speeds above and below that for which the blades are designed drops way below useful values. Our fish-head shaped entrance portions, indicated at FH in Fig. 10 and at R and T in Fig. 4, formed by parabolic portions avoid both extremes just mentioned, with the result that much higher efficiency is obtained over the selected operating speed range than has ever been obtained to our knowledge with blade heads that are either sharp or bluntly rounded. The efficiency curves of Fig. 12 clearly illustrate this fact. Note the much higher peak of the fish-head curve FH in relation to the curves for the bluntly rounded and sharp heads B and S, respectively.

The general parabolic-shaped blade profile has a further distinct advantage in that it allows the use of maximum curvature of the blades to obtain maximum torque increase with minimum number of bladed wheels. Referring to Fig. 2, the included angle $\beta_3$, formed by the tangents to the parabolic center line at the entrance and exit edges, is, in accordance with our invention, in the range of from 60° to 120° for the turbine and reaction member blades in the three bladed wheel converter. In multiple stage converters, larger angles are being used. To obtain substantially the same energy conversion along each path of fluid stream in the converter profile fluid circuit, the curvature of the blade profile is changed gradually from the inner to the outer streamline, as indicated in Fig. 2, and preferably so that the entrance angle of the inner streamline of the pump blade is 0° to 20° smaller than the angle on the outer streamline, and in the turbine and reaction blades is 0° to 20° larger. The exit angle of the inner streamline of the pump blade is 10° to 30° larger than on the outer streamline, and in the turbine and reaction blades is 5° to 25° larger on the inner than on the outer streamline. We have obtained best general operating characteristics with the following entrance and exit angles in the middle streamline:

|  | Entrance angles $\beta_1$ | Exit angles $\beta_2$ |
| --- | --- | --- |
| Blades in the pump | Between 60° and 90° | Between 30° and 60°. |
| Blades in the turbine | Between 40° and 70° | Between 20° and 50°. |
| Blades for reaction member. | Between 45° and 90° | Between 20° and 50°. |

The above angles are formed between the tangent to the parabolic center line of the blades at the entrance and exit edges, as indicated in Fig. 2, and the tangent on the circle having its center in the axis A—A of the converter at these points. The change in the included angles $\beta_3$, formed by the tangents of the entrance and exit portions of the blades, from the inner to the outer streamline, is 30° to 50° for the pump blades, and 5° to 25° for the turbine and reaction member blades. This continuous change of angles produces blades which have neither flat nor cylindrical portions at any point, all portions being formed by continuously and gradually changing parabolic portions, as best illustrated in Figs. 6 to 8. According to the range of variation of the direction of the on-coming fluid, in the range selected for highest efficiency, the parabolic entrance portions are made more or less pointed, as illustrated in Fig. 11 at $T_1$ to $T_6$. We have found the following head angles for the parabolic fish-head shaped entrance portions give the best results:

For the pump and turbine—between 20° and 50°
For the reaction member—between 30° and 60°

Heavily curved blades are given maximum thickness closer to the middle of the blade length, and the straighter blades, or blades of less curvature, are given the maximum thickness closer to the entrance edge portion, as best illustrated in Fig. 2.

We have found that fish-tail underbent angles Δβ between 5° and 25° give best results.

The wall friction in the operation of a torque converter increases with the number of blades used. The discharge also decreases with the number of blades used. In accordance with the present invention, the number of blades used has accordingly been reduced as much as possible, as follows:

For the pump wheel_____ 14 to 20
For the turbine_____ 15 to 21
For the reaction member_____ 11 to 15

The use of the underbent exit portion of the blades equalizing the streamlines enables this reduction in the number of blades, and that accounts to a large extent for the increase in efficiency of the converter, because the less wall friction in the converter channels and the less turbulence the blades cause in the flow the more fluid circulates in the turbine ring at a certain speed ratio, and, hence, the greater the power capacity, and the greater the torque increase, and the higher the efficiency.

It is believed the foregoing description conveys a good understanding of the objects and advantages of our invention. The appended claims have been drawn to cover all legitimate modifications and adaptations. It should be understood in regard to terminology used in the claims that:

1. "Minimum shock loss blade angles" means that the entrance portions of the blades of each wheel are angularly disposed with relation to the associated exit portion of the blades of the corresponding wheels in such a way that said entrance angle substantially corresponds to the resultant discharge angle of the flow for smoothly and without substantial shock losses receiving the fluid at a certain ratio of turbine speed to pump speed.

2. "Equal cross-sectional area of the circuit" means that the cross-sectional area of the fluid circuit measured on the inner side of said circuit is substantially equal to the cross-sectional area measured at the outer portion of said circuit, and that the cross-sectional area measured at all points between said extremes is substantially equivalent.

3. "Symmetrical bladed area of pump and turbine" means that the bladed area of the pump and turbine wheels in the fluid circuit cross-section are substantially symmetrically alike, that is, are substantially mirror pictures, extending over substantially the same inner and outer circuit contour and having substantially the same inside and outside radii of blade edges.

4. "Fish-shaped blade profile" means that the blades are streamlined, including air-foil and fluid-foil sections along the streamlines, having a more or less pointed and rounded entrance portion and a finely tapered exit portion, more particularly like forms of highly streamlined fast fish, more or less bent, with fish-head shaped entrance portions and fish-tail shaped exit portions, the portions between head and tail being smoothly curved to complete the general fish profile, with the thickest section between the entrance edge and the middle portion of the blade length.

We claim:

1. A hydraulic torque converter, comprising three bladed wheels, namely, pump, turbine, and reaction member arranged to form a closed fluid circuit in which the pump blade exists and turbine blade entrances are at substantially the largest circuit radius and the reaction member is at substantially the smallest circuit radius, the blades having fish-shaped profiles and having along the middle streamline entrance angles for the pump between 60 and 90 degrees, for the turbine between 40 and 70 degrees, for the reaction member between 45 and 90 degrees, the exit angles of the blades in the pump being 30 and 60 degrees, and for the turbine and reaction member between 20 and 50 degrees, the exit angle on the inner streamline on the blades of at least one of said bladed wheels being greater than on the outer streamline and varying gradually therebetween.

2. A hydraulic torque converter, comprising three bladed wheels, namely, pump, turbine, and reaction member arranged to form a closed fluid circuit in which pump blade exits and turbine blade entrances are at substantially the largest circuit radius and the reaction member is at substantially the smallest circuit radius, the blades having fish-shaped profiles, the blades having along the middle streamline entrance angles for the pump between 60 and 90 degrees, for the turbine between 40 and 70 degrees, for the reaction member between 45 and 90 degrees, the exit angles of the blades in the pump being between 30 and 60 degrees and for the turbine and reaction member between 20 and 50 degrees, the curvature of the blades changing gradually from the inner to the outer streamline, the entrance angle on the inner streamline as compared with the outer streamline being from 0 to 20 degrees smaller for the pump blades and from 0 to 20 degrees larger for the turbine and reaction member blades, the exit angle on the inner streamline as compared with the outer streamline being from 10 to 30 degrees larger for the pump blades and 5 to 25 degrees larger for the blades of the turbine and reaction member.

3. A torque converter as set forth in claim 1, in which the blades of said wheels have fish-tail shaped underbent exit portions inclined for an underbent angle of from 5 to 15 degrees.

4. A hydraulic torque converter, comprising three bladed wheels, namely, pump, turbine, and reaction member arranged to form a closed fluid circuit in which pump blade exits and turbine blade entrances are at substantially the largest circuit radius and the reaction member is at substantially the smallest circuit radius, the blades having fish-shaped profiles, the blades having along the middle streamline entrance angles for the pump between 60 and 90 degrees, for the turbine between 40 and 70 degrees, for the reaction member between 45 and 90 degrees, the exit angles of the blades in the pump being between 30 and 60 degrees and for the turbine and reaction member between 20 and 50 degrees, the blades having fish-head shaped entrance portions formed on parabolic curves, said blades having parabolic head angles which for the pump and turbine are between 20 and 40 degrees and for the reaction member between 30 and 60 degrees.

5. A hydraulic torque converter, comprising three bladed wheels, namely, pump, turbine, and reaction member arranged to form a closed fluid circuit in which pump blade exits and turbine blade entrances are at substantially the largest circuit radius and the reaction member is at substantially the smallest circuit radius, the blades having fish-shaped profiles, the blades having along the middle streamline entrance angles for the pump between 60 and 90 degrees, for the turbine between 40 and 70 degrees, for the reaction member between 45 and 90 degrees, the exit angles of the blades in the pump being between 30 and 60 degrees and for the turbine and reaction member between 20 and 50 degrees, said converter having from 14 to 20 blades in the pump, from 15 to 21 blades in the turbine, and from 11 to 15 blades in the reaction member.

6. A hydraulic torque converter, comprising three bladed wheels, namely, pump, turbine, and reaction member arranged to form a closed fluid circuit in which pump blade exits and turbine blade entrances are at substantially the largest circuit radius and the reaction member is at substantially the smallest circuit radius, the blades having fish-shaped profiles, the blades having along the middle streamline entrance angles for the pump between 60 and 90 degrees, for the turbine between 40 and 70 degrees, for the reaction member between 45 and 90 degrees, the exit angles of the blades in the pump being between 30 and 60 degrees and for the turbine and reaction member between 20 and 50 degrees, said converter having substantially circular circuit contours, the curvature of the blades changing gradually and continuously from the inner to the outer streamline of the turbine ring profile, the change of the included angle formed by the tangents to the longitudinal center line at the entrance and exit being between 30 and 50 degrees for the pump blades and between 5 and 20 degrees for the blades on the turbine and reaction member.

7. A hydraulic torque converter, comprising three bladed wheels, namely, pump, turbine, and reaction member arranged to form a closed fluid circuit in which pump blade exits and turbine blade entrances are at substantially the largest circuit radius and the reaction member is at substantially the smallest circuit radius, the blades having fish-shaped profiles, the blades having along the middle streamline entrance angles for the pump between 60 and 90 degrees, for the turbine between 40 and 70 degrees, for the reaction member between 45 and 90 degrees, the exit angles of the blades in the pump being between 30 and 60 degrees and for the turbine and reaction member between 20 and 50 degrees, the blades having fish-head shaped entrance portions formed on parabolic curves and fish-tail shaped underbent exit portions, the center lines of the blade profiles being parabolic curves, the circuit contours being substantially circular, and the pump having from 14 to 20 blades, the turbine from 15 to 21 blades, and the reaction member from 11 to 15 blades.

8. A hydraulic torque converter, comprising three bladed wheels, namely, pump, turbine, and reaction member arranged to form a closed fluid circuit in which pump blade exits and turbine blade entrances are at substantially the largest circuit radius and the reaction member is at substantially the smallest circuit radius, the blades having fish-shaped profiles, the blades having along the middle streamline entrance angles for the pump between 60 and 90 degrees, for the turbine between 40 and 70 degrees, for the reaction member between 45 and 90 degrees, the exit angles of the blades in the pump being between 30 and 60 degrees and for the turbine and reaction member between 20 and 50 degrees, the blades having fish-head shaped entrance portions and fish-tail shaped underbent exit portions, the circuit area being substantially equal at all points in the circuit and the circuit contour being substantially circular, the blade circuit space being substantially symmetrically alike for pump and turbine, the curvature of the blades changing gradually from the inner to the outer streamline, the entrance angle change from the inner to the outer streamline being between 0 to 20 degrees and the exit angle change being between 5 and 25 degrees, and the pump having 14 to 20 blades, the turbine having 15 to 21 blades and the reaction member having 11 to 15 blades.

9. A hydraulic torque converter, comprising bladed wheels, namely, pump, turbine, and reaction member arranged to form a closed fluid circuit in which the pump blade exits and turbine blade entrances are at substantially the largest circuit radius and the reaction member is at substantially the smallest circuit radius, said blades having fish-shaped profiles and having along the middle streamline entrance angles for the pump between 60 and 75 degrees, for the turbine between 45 and 60 degrees, and for the reaction member between 60 and 75 degrees, the exit angles of the blades in the pump being between 30 and 60 degrees, in the turbine between 25 and 40 degrees, and in the reaction member between 20 and 35 degrees.

10. A torque converter as set forth in claim 9, in which the pump has not less than 14 and not more than 20 blades, the turbine has not less than 15 and not more than 21 blades, and the reaction member has not less than 11 and not more than 15 blades.

11. A torque converter as set forth in claim 9, in which the curvature of the blades changes gradually and continuously from the inner to the outer streamline, the change of the included angle formed by the tangents to the longitudinal center line at the entrance and exit being from 30 to 50 degrees for the pump blades and from 5 to 25 degrees for the blades of the turbine and reaction member.

12. A hydraulic torque converter, comprising bladed wheels, namely, pump, turbine, and reaction member arranged to form a closed fluid circuit in which the pump blade exits and turbine blade entrances are at substantially the largest circuit radius and the reaction member is at substantially the smallest circuit radius, the blades having fish-shaped profiles, the exit angle along the middle streamline for the pump being between 30 and 60 degrees, for the turbine between 25 and 40 degrees, and for the reaction member between 20 and 35 degrees, the exit angle on the inner streamline on the blades of at least one of said bladed wheels being greater than on the outer streamline and varying gradually therebetween.

13. A torque converter as set forth in claim 1, in which the entrance angles on the inner and the outer streamline are substantially alike, and the exit angles on the inner streamline as compared to the outer streamline are 15 to 25 degrees larger for the pump blades, 5 to 15 degrees larger for the turbine blades and 5 to 10 degrees larger for the blades of the reaction member.

HEINRICH SCHNEIDER.
ADOLF G. SCHNEIDER.